Nov. 4, 1969  KENICHI YAMAMOTO  3,476,092
MULTI-UNIT ROTARY PISTON INTERNAL COMBUSTION ENGINE
Filed Nov. 16, 1967  2 Sheets-Sheet 1
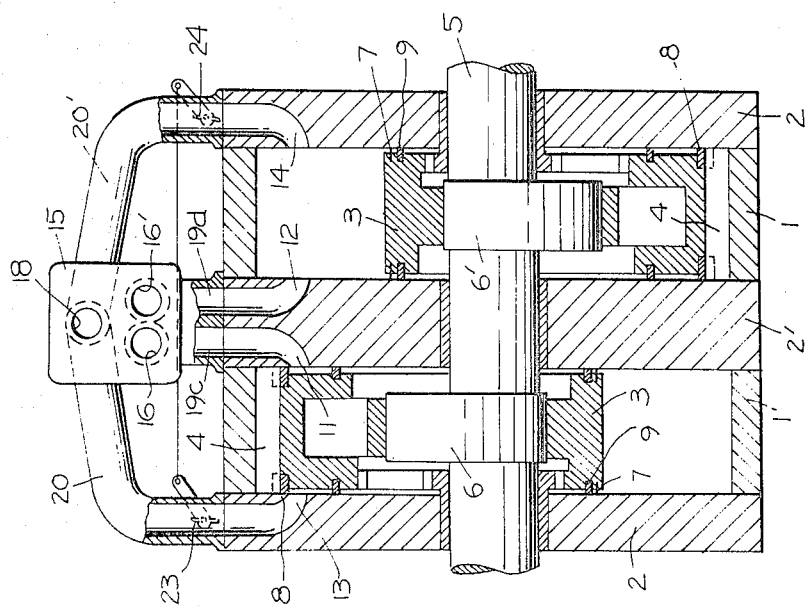
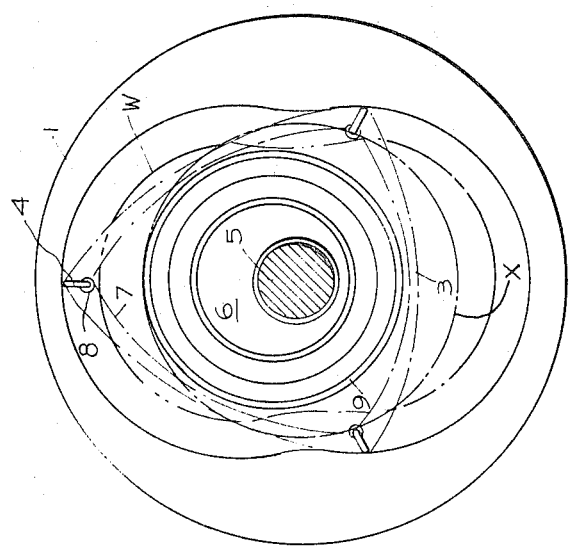
*INVENTOR*
KENICHI YAMAMOTO
BY *Wenderoth, Lund & Ponack*
ATTORNEYS Nov. 4, 1969  KENICHI YAMAMOTO  3,476,092
MULTI-UNIT ROTARY PISTON INTERNAL COMBUSTION ENGINE
Filed Nov. 16, 1967  2 Sheets-Sheet 2
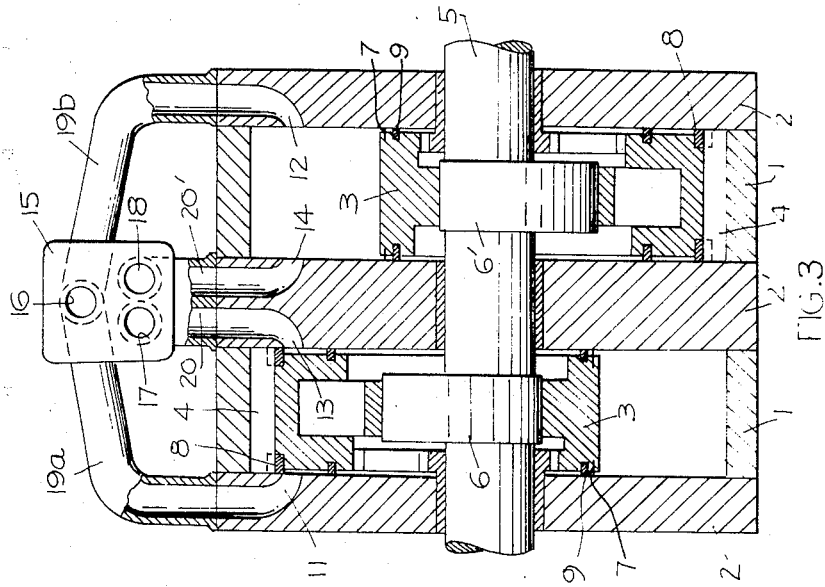
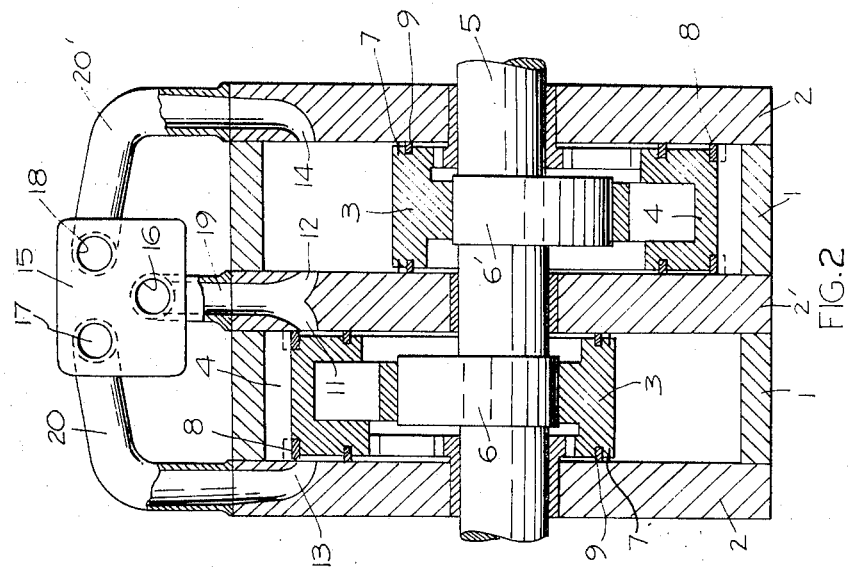
INVENTOR
KENICHI YAMAMOTO
BY *Wenderoth, Lind & Ponack*
ATTORNEYS

United States Patent Office 3,476,092
Patented Nov. 4, 1969

3,476,092
MULTI-UNIT ROTARY PISTON INTERNAL COMBUSTION ENGINE
Kenichi Yamamoto, Hiroshima-shi, Japan, assignor to Toyo Kogyo Company Limited, Hiroshima-ken, Japan
Filed Nov. 16, 1967, Ser. No. 683,531
Claims priority, application Japan, Nov. 16, 1966, 41/75,683; Nov. 17, 1966, 41/75,879
Int. Cl. F02b 53/04, 55/16
U.S. Cl. 123—8                                8 Claims

ABSTRACT OF THE DISCLOSURE

A multi-unit rotary piston internal combustion engine having a multiple carbureting device which is operatively connected to the working chamber of each engine unit through an intake port provided in each end wall of the engine housing to increase the performance of the engine.

---

This invention relates to a multi-unit rotary piston internal combustion engine having a plurality of rotary piston engine units in tandem, and more particularly to an improvement of an intake device for such an engine.

Each unit of a multi-unit rotary piston internal combustion engine generally consists of an annular casing having a trochoid-shaped internal peripheral wall and end walls on the opposite ends of the annular casing, which end walls have flat internal faces. A triangular rotary piston is rotatably mounted on an eccentric portion which is eccentrically mounted on a crankshaft which extends through the center of the cavity defined by the annular casing and the two end walls. At each apex of the rotary piston is a sealing member which forms a seal between the rotary piston and the annular casing and defining working chambers between the triangular piston and the trochoid-shaped internal wall of the annular casing. On the flat end face of the triangular piston adjacent the outer edge of the piston is also a sealing member forming a seal between the rotary piston and the end walls of the housing. Cooling of the rotary piston during the operation of the above described engine is carried out by supplying cooling oil through apertures provided around the eccentric portion within the rotary piston. On the flat faces of the opposite sides of the piston, the apertures through which the cooling oil is supplied, open in the axial direction and surrounding each of the said apertures is an internal sealing ring which also forms a seal between the piston and the end walls of the housing and maintains the cooling oil sealed within the apertures. The intake and exhaust ports may be provided either in the annular casing or in the end wall, and the rotary piston planetates with the sealing member on each apex portion thereof sealingly engaged with the internal surface of the annular casing thereby the strokes of intake, compression, combustion, expansion and exhaust strokes are performed.

Where the intake port opens through the annular casing, due to the specific structure hereinbefore described, considerable overlapping of the intake and exhaust occurs, which permits exhaust gases to penetrate into the fresh intake gases or permits the fresh intake gases to flow into the exhaust, and therefore results in rough rotation of the engine and as a result excessive fuel consumption, is inveitable. Otherwise, when the intake port is provided in the end wall, the radial outer edge of the intake port is restricted due to the path of the sealing members especially of a corner seal joining each end of the said sealing members on each end face of the rotary piston and, the radial inner edge of the intake port is also restricted due to the path of the internal sealing ring due to the planetary motion of the rotary piston. Further, the position of the edge of the intake port in the end wall is determined in view of the timing of the intake stroke termination. Under the restriction hereinabove described, providing an intake port having a sufficient intake area which is properly proportioned for the volume of the working chamber is impossible and the timing of the intake port closing is liable to be retarded and providing an efficient output increment of the engine is difficult.

An object of the present invention is to provide a multi-unit rotary piston internal combustion engine having at least two axially combined engine units and which can increase the performance thereof in the entire range of the engine operation.

Another object of the invention is to provide a multi-unit rotary piston internal combustion engine of the hereinabove described type in which the engine performance especially during high-speed and heavy-loaded operation is considerably improved.

Another object of the invention is to provide a multi-unit rotary piston internal combustion engine hereinabove described type in which the undesirable engine performance deterioration due to the intake-interference during high-speed and heavy-loaded operation is avoided.

A further object of the invention is to provide a multi-unit rotary piston internal combustion engine hereinabove described type in which the engine performance especially during low-speed and low-loaded operation is considerably increased.

A still further object of the present invention is to provide a multi-unit rotary piston internal combustion engine of the hereinabove described type wherein the undesirable engine performance deterioration due to the intake-interference between adjacent engine units especially during low-speed and low-loaded operation is eliminated.

Other and further objects and advantages of the present invention will become apparent from the following specification in connection with the accompanying drawings, in which:

FIGURE 1 is a schematic, transverse, sectional view of a rotary combustion engine;

FIGURE 2 is a longitudinal sectional view of a rotary piston internal combustion engine according to the present invention; and FIGURES 3 and 4 each show a modification of the present invention.

Referring to the drawings, the engine housing comprises at least two axially spaced annular casings 1 having an at least two-lobed epi-trochoid internal peripheral wall. Secured at axial outer ends of the said casings 1 are end walls 2, and the said axially spaced casings 1 have an intermediate end wall 2′ so that at least two cavities are defined therebetween in the engine housing. Extending through the center of the said housing is a crankshaft 5 which is rotatably mounted in the main bearing bore provided in each end wall 2 and intermediate end wall 2′, and which has eccentric portions 6, 6′ one positioned in the cavity of each unit. Rotatably mounted on each of the said eccentric portions 6, 6′ is a rotary piston 3 having at least 3 apexes. Disposed at each apex of the said rotary piston 3 is an apex seal member 4 adapted for sealing engagement with the internal peripheral wall of the annular casing 1. Said rotary pistons 3 each have substantially flat end faces at the opposite ends thereof and disposed on each end face of the pistons radially outwardly spaced from the bearing portion of the piston on the eccentric portion 6 is an oil seal ring 9 adapted for sealing engagement with the adjacent end wall inner face for blocking the leakage of the cooling and/or lubrication oil radially outwardly therefrom. Adjacent the radial outermost edge of the said rotary piston end faces and radially outwardly spaced from the said oil seal ring 9 are side seal strips 7 one of which extends between a pair of the said apex seals 4, and each end of the said apex seal member 4 and the said side seal strips 7 are connected by a corner seal member 8 disposed adjacent each apex portion of the rotary piston 3, whereby a plurality of sealed working chambers are formed between the rotary piston 3 and the engine housing internal surface and each of the said working chambers varies in volume when the rotary piston 3 planetates as hereinafter explained. A circular line shown in FIGURE 1 as a dotted line and designated with reference letter W is a path along which the corner seal members portions move when the rotary piston 3 planetates. A delimiting circle shown in FIGURE 1 as a dotted line and designated with reference letter X is a path along which the radially outermost portion of the oil seal ring 9 moves during the rotary piston planetary motion.

Operatively connected to each of the working chambers is a multiple carbureting device 15 as shown in FIGURES 2 and 3 which comprises one primary carburetor 16 and two secondary carburetors 17, 18. The primary carburetor 16 is connected to each of the working chambers through primary intake ports 11 and 12. The intake ports 11 and 12 are provided, in the embodiment shown in FIGURE 2, in the intermediate end wall 2' and connected with the carburetor 16 through a common conduit 19. In the modified embodiment as shown in FIGURE 3, the intake ports 11 and 12 are provided in the end walls 2 and 2' and are connected through conduits 19a and 19b to the common carburetor 16. Separately disposed in the said carbureting device 15 are secondary carburetors 17 and 18 which are separately connected to the working chamber through secondary intake ports 13 and 14 by individual conduits 20 and 20'. The embodiment shown in FIGURE 2 has the secondary intake ports 13 and 14 provided in the end walls 2, and in the modified form shown in the FIGURE 3 the secondary intake ports 13 and 14 are provided separately in the intermediate end wall 2'. An ignition means for igniting the compressed working fluid may be provided in the conventional manner so that thereby the strokes of intake, compression, combustion, expansion and exhaust are performed during planetary motion of the rotary piston of the rotary piston 3 within the engine housing.

FIGURE 4 shows a further modification of the invention in which the multiple carbureting device 15 comprises two primary carburetors 16 and 16' and one secondary carburetor 18. The primary carburetors separately disposed in the carbureting device 15 and designated with reference numerals 16 and 16' and connected to the working chambers through the primary intake ports 11 and 12 which are separately provided in the intermediate end wall 2', being connected with one of the said carburetors 16 and 16' by means of conduits 19c and 19d. In this modification the secondary carburetor designated by reference numeral 18 is a single carburetor and is connected to each working chamber through the secondary intake ports 13 and 14 by way of the conduits 20 and 20'. Provided within the conduits 20 and 20' in this modification are throttle valve means 23 and 24 which are manually and/or automatically and individually and/or simultaneously operated for controlling the secondary intake operation.

In the embodiments shown in FIGURES 2 and 3, the primary carburetor 16 will be operated for the low-speed and low-loaded operation and the primary intake ports 11 and 12 will be formed so that they are suited for such low-speed and low-loaded operation, that is, for instance, to permit the retarded intake opening and to permit the early intake closing. For the higher-speed and heavier-loaded operation, the secondary carburetors 17 and 18 will be operated alone or together with the primary carburetor 16 and, the position of the said secondary intake ports 13 and 14 will be such that they can permit the early intake opening and can permit the retarded intake closing of the ports 13 and 14. The primary intake conduits 19, 19a and 19b will accordingly be formed so that they are suited for the low-speed and low loaded operation, that is, for instance, a smaller cross section of the said conduits or conduit which allows higher flow velocity will be preferable. On the other hand, the secondary intake conduits 20, 20' will be formed so as to permit the intake for the high-speed and heavy-loaded operation, that is, for instance, a larger cross section of the secondary intake conduit which allows the larger volume flow therethrough.

During operation for the low-speed and low-loaded condition, the intake of the fuel and air mixture will be, therefore, smaller and, since the overlap of the primary intake ports with that of the adjacent engine unit will be minimized, the vibration of the intake gases due to the intake pressure variation of the working fluid will be minimized, and therefore, the undesirable effect due to the intake interference which takes place between two engine units can be substantially eliminated although the primary carburetor in single form is adapted for the multiple engine units. The secondary intake ports always have a large overlap due to the inherent nature of their function. However, with the embodiments of FIGS. 2 and 3, since the secondary carburetors separately provided and separately operate for each engine unit, the overlapping thereof is completely eliminated. In addition, in the embodiment shown in FIGURE 3, since the primary intake ports are provided in the axially outermost end wall and the primary intake is performed through the longer primary intake conduits, the intake interference is minimized further.

The modification shown in FIGURE 4 is similar in its basic structure to the embodiments shown and explained with reference to FIGURES 2 and 3. There the throttle valve means 23 and 24 are operatively provided in the secondary intake conducts 20 and 20' and are manually and/or automatically operated in response to either the engine rotation speed or the degree of the load or both. In this modification, undesirable effects due to the secondary intake conduits are prevented during the time the engine is in operation under the supply of the fuel-air mixture from the primary carburetors 16 and 16' only. The position of these throttle valve means 23 and 24 may be optionally determined but, placing them closer to the secondary intake ports 13 and 14 will be preferable. In this modification, the intake interference of the primary intake is completely eliminated and, the cross section of the primary intake conduit can be optionally determined so that it is best suited to the operating conditions. Further, since the primary intake conduits 19c and 19d can be sufficiently shortened, the inflow resistance of the fuel-air mixture can be minimized. Another specific advantage of this modification is that since the undesirable effect of the secondary intake conduits 20 and 20' is blocked by the said throttle valve means 23 and 24, the engine performance, when the engine is operated with operation of the primary carburetors 16, 16' only for the low-speed and low-loaded operation, is considerably improved. According to the present invention, the performance of the multi-unit rotary piston internal combustion engine is increased over the entire range of the engine operation, and particularly the engine performance during the low-speed and low-loaded operation or the high-speed and high-loaded operation is considerably improved selectively in accordance with the requirements for the engine performance.

What is claimed is:

1. A multi-unit rotary piston internal combustion engine comprising a housing composed of at least two annular casings axially spaced from each other and end walls closing both ends of each of the said annular casings to form at least two cavities one in each casing, a crankshaft rotatably mounted in the said end walls and extending through the center of the said cavities, at least two eccentric portions axially spaced from each other and eccentrically mounted on the said crankshaft, one eccentric portion positioned in each of the said cavities, a rotary piston rotatably mounted on each of the said eccentric portions within the said cavities, each rotary piston having a peripheral surface with a plurality of circumferentially spaced apex portions and opposite end faces, an apex seal member disposed on each of the said apex portions, a side seal strip disposed on each of the said end faces and extending between a pair of adjacent apex seal members, a corner seal member disposed on each of the said end faces and connecting each end of the said apex seal member and the said side seal strips, an oil seal ring on each of the said end faces radially inwardly spaced from the said side seal strips, the said apex seal members, side seal strips, corner seal members and oil seal rings being in sealing engagement with the said housing to define a plurality of working chambers which vary in volume and perform the strokes of intake, compression, combustion, expansion and exhaust during the planetary rotation of the said rotary pistons, one of said end walls of each cavity having a primary intake port therein, the other of the said end walls of each cavity having a secondary intake port therein, a multiple carbureting device having a single primary carburetor and at least two secondary carburetors, a common primary intake conduit connecting the said primary intake port of each cavity with the said single primary carburetor, and individual secondary intake conduits connecting the said secondary intake port of each cavity with the respective secondary carburetors.

2. A multi-unit rotary piston internal combustion engine as claimed in claim 1 in which the said primary intake ports have a shape for permitting retarded intake opening and early intake closing and the said secondary intake ports having a shape for permitting early intake opening and retarded intake closing.

3. A multi-unit rotary piston internal combustion engine as claimed in claim 1 in which the said housing has only three end walls, one of which is positioned between and is common to the said two annular casings, the said primary intake port of each cavity being in the said end wall positioned between the said two annular casings and the said secondary intake ports of each cavity being in the said end walls at the axial outer ends of each of the said annular casings.

4. A multi-unit rotary piston internal combustion engine as claimed in claim 1 in which the said housing has only three end walls, one of which is positioned between and is common to the said two annular casings, the said primary intake port of each cavity being in the said end walls at the axial outer ends of each of the said annular casings and the said secondary intake port of each cavity being in the said end wall positioned between the said two annular casings.

5. A multi-unit rotary piston internal combustion engine comprising a housing composed of at least two annular casings axially spaced from each other and end walls closing both ends of each of the said annular casings to form at least two cavities one in each casing, a crankshaft rotatably mounted in the said end walls and extending through the center of the said cavities, at least two eccentric portions axially spaced from each other and eccentrically mounted on the said crankshaft, one eccentric portion positioned in each of the said cavities, a rotary piston rotatably mounted on each of the said eccentric portions within the said cavities, each rotary piston having a peripheral surface with a plurality of circumferentially spaced apex portions and opposite end faces, an apex seal member disposed on each of the said apex portions, a side seal strip disposed on each of the said end faces and extending between a pair of adjacent apex seal members, a corner seal member disposed on each of the said end faces and connecting each end of the said apex seal member and the said side seal strips, an oil seal ring on each of the said end faces radially inwardly spaced from the said side seal strips, the said apex seal members, side seal strips, corner seal members and oil seal rings being in sealing engagement with the said housing to define a plurality of working chambers which vary in volume and perform the strokes of intake, compression, combustion, expansion and exhaust during the planetary rotation of the said rotary pistons, one of said end walls of each cavity having a primary intake port therein, the other of the said end walls of each cavity having a secondary intake port therein, a multiple carbureting device having at least two primary carburetors and a single secondary carburetor, individual primary intake conduits connecting said primary intake port of each cavity with the respective primary carburetors, and a common secondary intake conduit connecting the said secondary intake port of each cavity with the secondary carburetor.

6. A multi-unit rotary piston internal combustion engine as claimed in claim 5 in which the said primary intake ports have a shape for permitting retarded intake opening and early intake closing and the said secondary intake ports have a shape for permitting early intake opening and retarded intake closing.

7. A multi-unit rotary piston internal combustion engine as claimed in claim 5 in which the said housing has only three end walls one of which is positioned between and is common to the said two annular casings, the said primary intake port of each cavity being in the said end wall positioned between the said two annular casings and the said secondary intake port of each cavity being in the said end walls secured at the axial outer ends of each of the said annular casings.

8. A multi-unit rotary piston internal combustion engine as claimed in claim 7 further comprising a throttle valve means operated in response to the engine rotation speed and the degree of the load and positioned in the said secondary intake conduit close to the said secondary intake port.

References Cited

UNITED STATES PATENTS 3,244,153  4/1966  Froede.
3,347,213  10/1967  Froede.

C. J. HUSAR, Primary Examiner